US008052847B2

(12) United States Patent
Koban et al.

(10) Patent No.: US 8,052,847 B2
(45) Date of Patent: Nov. 8, 2011

(54) SYSTEM AND METHOD FOR REMOVING MOISTURE FROM LIQUID DESICCANT

(75) Inventors: Matthew Koban, North Tonawanda, NY (US); Phillip Rowland, Getzville, NY (US); Michael Harvey, Lockport, NY (US); Peter Demakos, Buffalo, NY (US)

(73) Assignee: Niagara Blower Company, Buffalo, NY (US)

( * ) Notice: Subject to any disclaimer, the term of this patent is extended or adjusted under 35 U.S.C. 154(b) by 710 days.

(21) Appl. No.: 11/901,247

(22) Filed: Sep. 14, 2007

(65) Prior Publication Data

US 2009/0071812 A1    Mar. 19, 2009

(51) Int. Cl.
| | |
|---|---|
| *B01D 1/14* | (2006.01) |
| *B01D 1/16* | (2006.01) |
| *B01D 3/02* | (2006.01) |
| *B01D 53/14* | (2006.01) |
| *C07C 27/28* | (2006.01) |
| *F25D 17/06* | (2006.01) |

(52) U.S. Cl. ............ 203/18; 62/94; 62/271; 159/4.01; 159/16.1; 159/46; 159/48.1; 159/901; 202/161; 202/176; 202/183; 202/184; 202/236; 203/21; 203/49; 203/90; 203/98; 261/140; 261/151; 261/158; 568/916; 568/917; 95/194; 96/234; 96/295

(58) Field of Classification Search .............. 62/94, 119, 62/121, 271; 159/4.01, 16.1, 23, 46, 48.1, 159/901; 202/153, 161, 176, 183, 184, 236; 203/18, 21, 49, 90, 98; 261/140, 151, 158; 568/916, 917; 95/194; 96/234, 295
See application file for complete search history.

(56) References Cited

U.S. PATENT DOCUMENTS

| 3,397,731 | A | * | 8/1968 | Wood et al. ............. 159/16.1 |
|---|---|---|---|---|
| 3,450,603 | A | * | 6/1969 | Coggins et al. ................ 203/18 |
| 4,010,009 | A | * | 3/1977 | Moyer ............................. 95/194 |
| 4,054,431 | A | * | 10/1977 | Kotcharian ..................... 95/192 |
| 4,180,985 | A | * | 1/1980 | Northrup, Jr. .................... 62/94 |
| 4,701,188 | A | * | 10/1987 | Mims ................................ 95/18 |
| 4,753,664 | A | * | 6/1988 | Honerkamp et al. .......... 96/242 |
| 5,269,886 | A | * | 12/1993 | Brigham, Sr. ................. 202/176 |
| 6,004,380 | A | * | 12/1999 | Landreau et al. .............. 95/174 |
| 6,375,806 | B1 | * | 4/2002 | Hicks .............................. 203/18 |
| 7,306,654 | B2 | * | 12/2007 | King et al. ...................... 95/224 |

* cited by examiner

*Primary Examiner* — Virginia Manoharan
(74) *Attorney, Agent, or Firm* — Niro, Haller & Niro

(57) ABSTRACT

A system and method for removing water from a liquid desiccant such as a glycol used to dry cooled air in order to restore the desiccant to a purity up to around 97% in a closed continuous flow process. Liquid desiccant can be sprayed into cooled air in a conditioner where it gains moisture. The wet or gained desiccant can be optionally preheated in an economizing heat exchanger and then routed into a concentrator. Desiccant pure to around 97% can be removed from the concentrator, passed through an economizing heat exchanger to provide the preheating and returned to the conditioner holding area. The concentrator can be heated by steam or other means such as natural gas to boil the wet desiccant causing mixed vapor to enter a vertical distillation column where most of the glycol condenses out on the column packing or plates and returns to the concentrator. Almost pure water vapor normally passes out of the top of the column and can be condensed in a water-cooled (or otherwise cooled) condenser and collected or discarded as liquid water. A portion of the water can be piped back into the top of the column as a reflux stream that scrubs the column packing or plates of desiccant. In this way, the desiccant can be purified to around 97%.

13 Claims, 4 Drawing Sheets

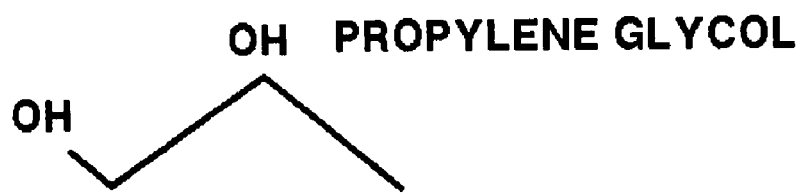
FIG. 2A
FIG. 2B
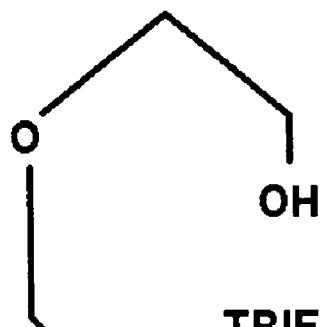
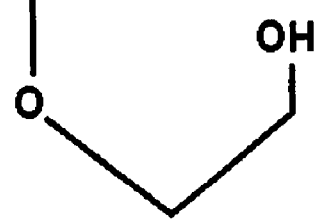
FIG. 2C

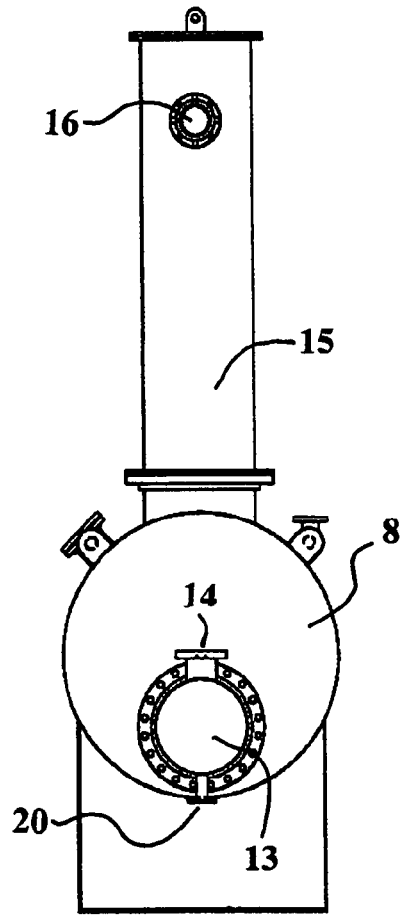
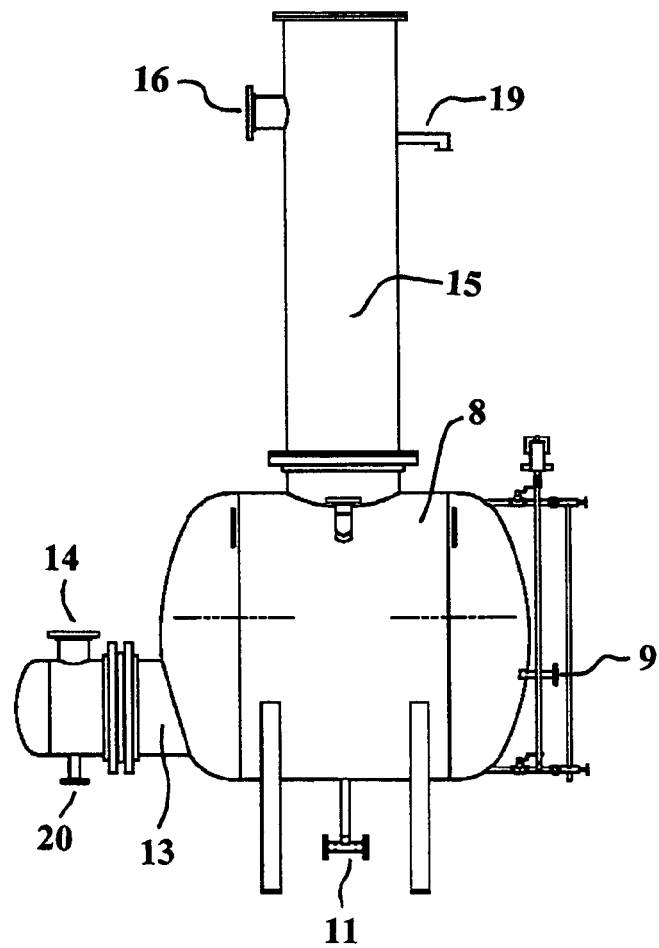
FIG. 3A                    FIG. 3B

SYSTEM AND METHOD FOR REMOVING MOISTURE FROM LIQUID DESICCANT

BACKGROUND

1. Field of the Invention

The present invention relates generally to providing cool dry air and more particularly to a method and apparatus for removing moisture from a liquid desiccant using distillation.

2. Description of the Prior Art

It is desirable in many industries such as breweries, meat and food packaging and processing and storage facilities to require cooled air that is also dry. When ambient air containing a particular amount of moisture is cooled, it is well known that the relative humidity increases. If the temperature is taken below the dew point, condensation takes place. Even at temperatures above the dew point, air with high relative humidity is undesirable. To achieve cool and also dry air, some form of dehumidification is necessary. The use of a solid or liquid desiccant are two methods for removing moisture. Liquid desiccants are easier to manipulate than solid desiccants and are hence preferred. A major problem is that the desiccant, if not continually exchanged, becomes saturated and hence useless. It is therefore desirable to have a continuous flow system where the absorbed moisture is continually removed from the desiccant and the desiccant is regenerated and re-used.

It is well known in the art to use liquid desiccants such as glycols, alcohols, ketones and other substances to remove moisture from gases. Landreau et al. in U.S. Pat. No. 6,004,380 and U.S. Pat. No. 6,461,413 teach drying natural gas using glycols and regenerating the desiccant. Parodowski in U.S. Pat. No. 5,670,027 teaches distillation of a liquid desiccant such as an alcohol or acetone. Lyon et al. in U.S. Pat. No. 4,009,083 teach regeneration of a an acid gas absorbing liquid using elevated pressure. Lermite et al. teach regeneration of a desiccant using a stripping agent.

It would be highly advantageous to have a system and method to dry cool air using a liquid desiccant that can be regenerated to an acceptable purity level up to 97% using inexpensive, readily available equipment such as a distillation column and condenser, and inexpensive available energy such as from steam or natural gas. Electricity could also be used.

SUMMARY OF THE INVENTION

The present invention relates to a system and method for removing the water from a liquid desiccant such as a glycol that is used to dry cool air in order to restore the desiccant to a purity up to 97% in a closed continuous flow process. Liquid desiccant can be sprayed into cooled air in a conditioner where it gains moisture. The wet or gained desiccant can be pumped directly into a concentrator, or it can be preheated in a heat exchanger and then routed into the concentrator. Desiccant pure to around 97% can be removed from the concentrator, passed through the economizing heat exchanger to provide the preheating, and returned to the conditioner holding area. The concentrator can be heated by steam or other means such as natural gas or electricity to boil the wet desiccant causing mixed vapor to enter a vertical distillation column where most of the glycol condenses out on the column packing and returns to the concentrator. Almost pure water vapor normally passes out of the top of the column and can be condensed in a water-cooled (or otherwise cooled) condenser and collected or discarded as liquid water. A small portion of the water (or other water) can be piped back into the top of the column as a reflux stream that scrubs the column packing of desiccant. In this way, the desiccant can be purified to some degree usually less than 97%. The preferred desiccant is a glycol with the preferred glycol being propylene glycol, ethylene glycol or triethylene glycol. While these are the preferred desiccants, any other liquid desiccant with a boiling point above that of water can be used.

DESCRIPTION OF THE FIGURES

FIGS. 2A-2C show chemical representations of three commonly used glycol desiccants.

FIGS. 3A-3B show an end and side view of a particular embodiment of distillation column concentrator and column.

Several drawings and illustrations have been presented to aid in understanding the present invention. The scope of the present invention is not limited to what is shown in the figures.

DESCRIPTION OF THE INVENTION

The present invention relates to a system and method of removing water from liquid desiccants such as glycols. It is well known that various glycols have a particular affinity for water and absorb it readily. Among glycols commonly used commercial as desiccants are propylene glycol, ethylene glycol and triethylene glycol. Each of these liquids is an oil with a relatively high boiling point. For example, propylene glycol boils at 188° C., ethylene glycol at 197° C. and triethylene glycol at 278° C. Each of these boiling points is considerably higher than the boiling point of water at 100° C. Thus it becomes possible to distill the absorbed water from the glycol at temperatures between the boiling point of water and a temperature where the glycol may degrade. It is known that glycols will degrade if they are maintained at temperatures near their boiling points. For example, triethylene glycol may begin to degrade above 240° C. However, there is a wide range of safe temperatures above 100° C. and what could be called the upper safe temperature of the glycol (which is around 204° C. for triethylene glycol). All of the three glycols named above are known to be stable at temperatures below 140° C.

Figure 1:
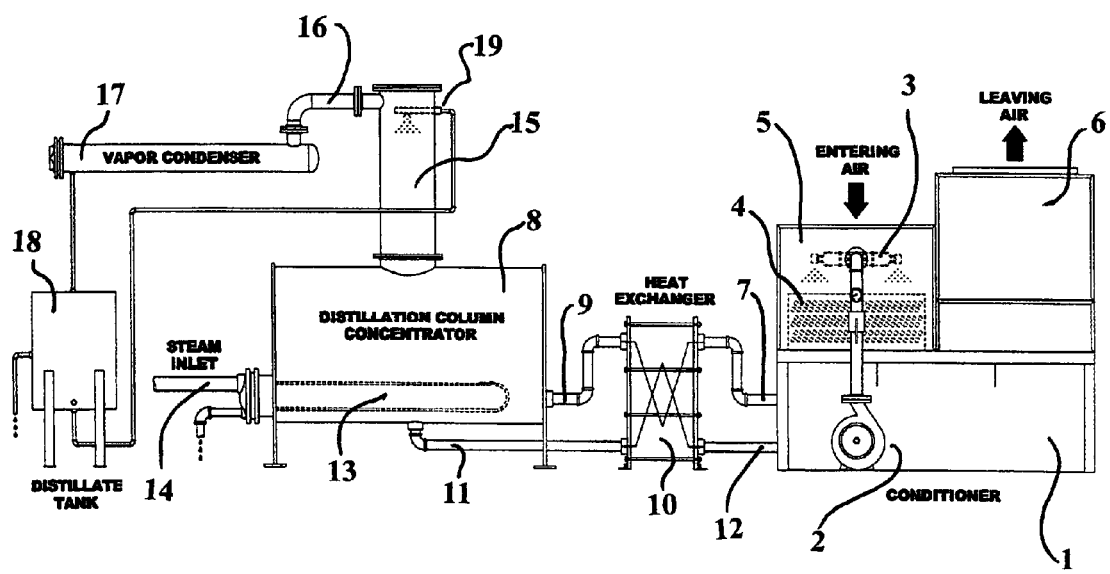
FIG. 1 shows a diagram of an embodiment of the present invention.

A standard refrigeration or HVAC system is used to cool air to a desired temperature by passing it over evaporation coils. Warm air entering such a system can be sprayed with the liquid desiccant as it passes the cooling coils. The desiccant can also be pre-cooled and sprayed over some surface area with air also passing over it. Turning to FIG. 1, a diagram of an embodiment of the present invention can be seen. Warm air enters the system at an entrance port 5 and is immediately sprayed with the liquid glycol by means of a spray nozzle arrangement 3 as it passes over the evaporator coils 4. The bulk desiccant is contained in a tank 1 from where it is pumped to the nozzles 3 by a pump 2. The air/desiccant mixture passes down into the tank where the air flows above the liquid desiccant and finally leaves by an exit port 6. The removal of water from the cool air prevents condensation in low temperature applications and causes dew point depression in low and high temperature applications. Since the glycol desiccant is a heavy liquid, almost all of it remains behind. Air velocities are kept fairly low, and vapor pressures carefully examined per application to insure that only cool, dry air leaves the exit port 6. The amount of dehumidification can be controlled by changing the concentration of the spray and amount of spray.

It should be noted that in an open system, the wet or gained liquid desiccant could be discarded and replaced with new fresh material. However, this is expensive and very commercially undesirable. Rather, the present invention allows purification of the gained desiccant up to around 97% by removing the absorbed water. The purified desiccant can then be returned to the bulk tank 1.

Wet or gained desiccant is taken from the bulk tank 1 through piping 7, pumped through an optional economizing heat exchanger 10 and into a distillation concentrator 8 at a certain level. Purified desiccant is returned in a closed loop from the concentrator from the bottom 11, through opposite loop of the economizing heat exchanger 10 and back into the bulk tank 1. While the economizing heat exchanger 10 is optional, it is very useful in performing two functions. First, it cools the returning desiccant to a working temperature that is not too hot, while second it pre-heats the wet desiccant in preparation for distillation. By recycling a portion of the waste heat back into the concentrator, it also greatly increases the overall efficiency of the system.

As the gained desiccant enters the concentrator 9, it encounters a source of heat 13 that can be a steam pipe with steam entering from a steam inlet 14, or any other heat source such as a natural gas (or other fuel) burner. Enough heat must be supplied to continuously produce a vapor entering the column. The exact concentration of this azeotrope (and hence its exact boiling temperature) depends on how wet the desiccant in the concentrator is. This will be determined by the mass flow rate of desiccant solution entering the concentrator, leaving the concentrator and moisture being liberated by the concentrator. However, in typical operation as described, and with proper feed rates and proper heat control, the purity of the desiccant in the concentrator can be maintained up to around 97% in continuous flow back to the economizing heat exchanger and bulk tank.

The distilling column 15 is a typical column that concentrates the water in the rising vapor. The water vapor exit 16 at the top of the column consists of almost pure water vapor from the column. Most of the glycol descends back into the concentrator from the column. A small amount of condensed liquid water is returned into the top of the column 19 as a reflux which serves to scrub glycol from the column packing, and carry it back into the concentrator 8.

Almost pure water vapor leaves 16 the column and enters a condenser 17 where it condenses and drains into a distillate tank 18. Typically, the condenser is water cooled; however, any method of cooling the condenser or removing heat from the almost pure water vapor is within the scope of the present invention. Other than the small amount of water taken from the distillate tank for the reflux 19, the bulk of the distillate is discarded as almost pure water.

FIGS. 2A-2C show chemical information for three preferred glycol desiccants. The first is iso-propylene glycol which has the chemical formula of $HOCH_2OHCH_2CH3$ or simply CC(O)CO shown in FIG. 2A. The boiling point of the pure substance is 188.2° C. while its specific gravity is 1.036. The second desiccant is shown in FIG. 2B and is ethylene glycol with a chemical formula of $HOCH_2CH_2OH$ or simply OCCO. The boiling point of the pure substance is 197.3° C. with a specific gravity of 1.1132. The third desiccant is shown in FIG. 2C is triethylene glycol with a chemical formula of $HOCH_2CH_2OCH_2CH_2OCH_2CH_2OH$ or simply OCCOCCOCCO. The pure substance has a high boiling point of 278° C. and a specific gravity of 1.124. While these are preferred desiccants, many other similar substances could be used and are within the scope of the present invention.

FIGS. 3A-3B show a side and front view of an embodiment of a distillation column and column concentrator. The column 15 rises out of the concentrator 8 near the center. A steam inlet 14 feeds a heater insert 13 that runs into the concentrator. A water drain 20 is used to remove condensed steam. Wet desiccant enters the concentrator through a side fitting 9 and is drained out from a bottom fitting 11. Almost pure water vapor exits the column 15 at a port 16 near the top. Reflux water enters a refluxer port 19 where it is used to scrub the packing in the column as previously discussed. Pumps (not shown in the figures) are used to move desiccant from the bulk holding area, through the economizing heat exchanger and into the concentrator as well as out of the concentrator and back to the holding area. A pump can also be used to move the reflux water back into the column.

Figure 4:
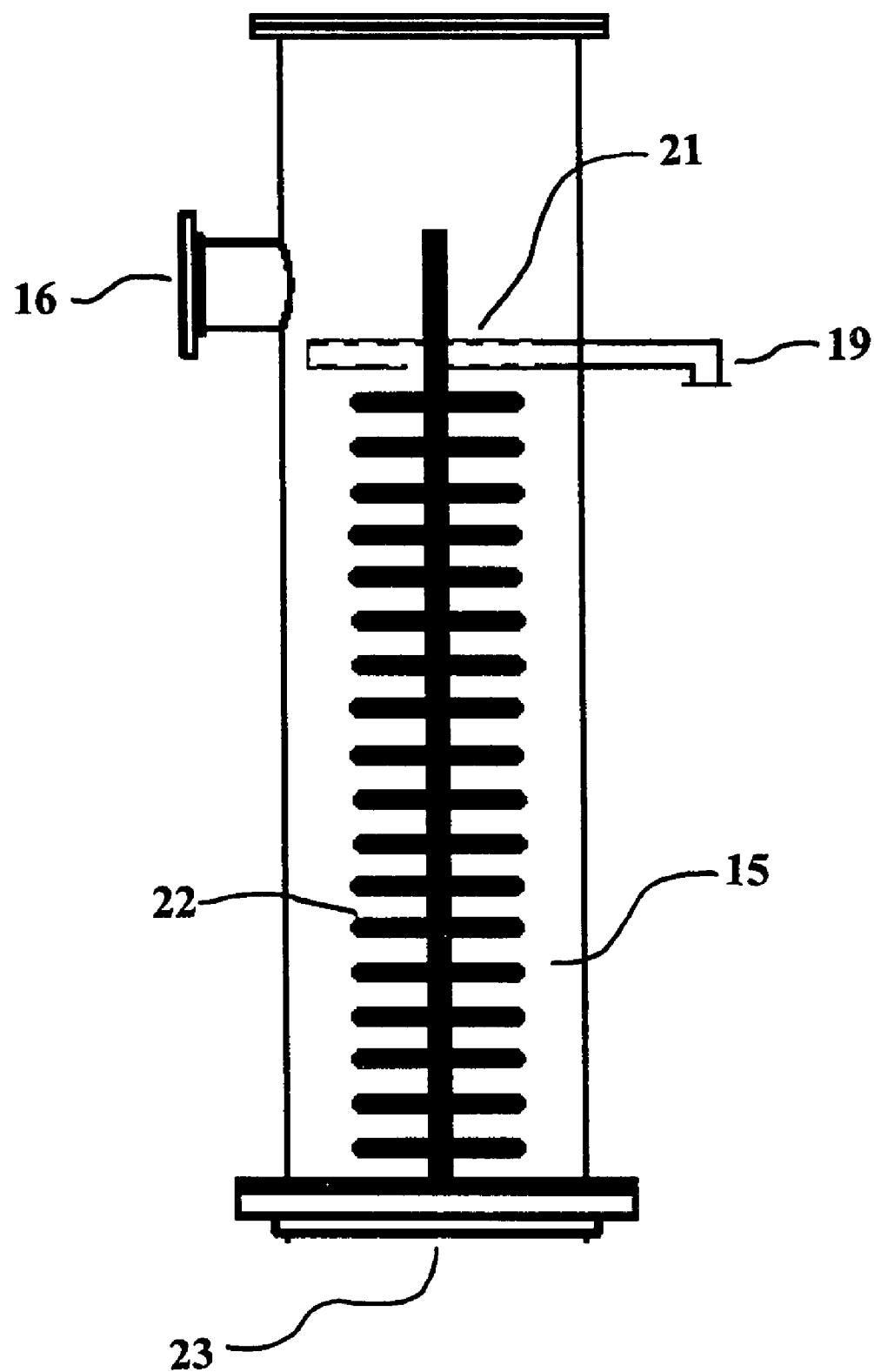
FIG. 4 shows a generic detail of a distillation column with reflux.

FIG. 4 shows a detail of a generic distillation column 15. Hot vapor enters the bottom 23 and ascends the column. By the well-known principles of such columns, the amount of water in the mix becomes more concentrated along a gradient up the column to where at the top plate, the rising vapor is almost pure water (the substance with the higher boiling point condenses out along the packing 22 and refluxes downward). As discussed, extra reflux water enters the column from the side near the top 19 and is applied to the packing at the top 21 to scrub the packing of accumulated condensed glycol. The end result is that most of the glycol condenses in the column and is scrubbed back down into the concentration chamber. The water on the other hand leaves the column as vapor to be subsequently condensed. A portion of this is reintroduced to the column, while the rest is discarded.

Several descriptions and illustrations have been provided to aid in the understanding of the present invention. One of skill in the art will realize that numerous variations and changes can be made without departing from the spirit of the invention. Each of these changes and variations is within the scope of the present invention.

We claim:

1. A method for recovery of liquid desiccant in a closed loop comprising:
    spraying liquid desiccant from a desiccant holding area into an air stream, wherein said desiccant absorbs water from said air forming wet desiccant;
    removing said wet desiccant and preheating it in a heat exchanger;
    moving preheated wet desiccant from said heat exchanger into a concentrator;
    boiling said preheated wet desiccant in the concentrator producing a mixed vapor;
    causing said mixed vapor to enter a distillation column at a bottom end, wherein water vapor exits said distillation column at a top end;
    condensing said water vapor to purified water in a condenser and storing it;
    spraying a portion of said purified water entering through a refluxer port into said distillation column in proximity to the top end of said column to scrub said desiccant from said column; and
    returning purified desiccant from said concentrator through said heat exchanger and into a desiccant holding area.

2. The method of recovery of liquid desiccant of claim 1 wherein said desiccant is a glycol.

3. The method of recovery of liquid desiccant of claim 2 wherein said glycol is chosen from the group consisting of propylene glycol, ethylene glycol and triethylene glycol.

4. The method of recovery of liquid desiccant of claim 1 wherein said concentrator is heated with steam.

5. The method of recovery of liquid desiccant of claim 1 wherein said concentrator is heated by natural gas.

6. The method of recovery of liquid desiccant of claim 1 wherein said condenser is water cooled.

7. A system for recovery of liquid desiccant in a closed loop comprising:
- a desiccant holding area from which liquid desiccant is sprayed into an air stream, wherein said desiccant absorbs water from said air forming wet desiccant;
- a heat exchanger wherein said wet desiccant is preheated;
- a concentrator into which preheated wet desiccant from said heat exchanger is moved and boiled producing a mixed vapor;
- a distillation column receiving said mixed vapor, wherein water vapor exits said distillation column at a top end;
- a condenser wherein said water vapor is condensed to purified water, and recovered desiccant is returned to said desiccant holding area through said heat exchanger;
- a water storage area where said purified water is stored; and
- a spray in proximity to the top end of said distillation column wherein a portion of said purified water entering a refluxer port is sprayed into the distillation column to scrub desiccant from the column.

8. The system of claim 7 wherein said concentrator is steam heated.

9. The system of claim 7 wherein said concentrator is natural gas heated.

10. The system of claim 7 wherein said desiccant is a glycol.

11. The system of claim 10 wherein said glycol is chosen from the group consisting of propylene glycol, ethylene glycol and triethylene glycol.

12. The system of claim 7 wherein said condenser is water cooled.

13. The system of claim 7 wherein said desiccant is purified up to around 97%.

* * * * *